(12) United States Patent
Becker et al.

(10) Patent No.: US 8,896,006 B2
(45) Date of Patent: Nov. 25, 2014

(54) RED-EMITTING SR2S15N8 LUMINESCENT MATERIAL AND LIGHT SOURCE HAVING A LUMINESCENT MATERIAL OF SUCH KIND AS WELL AS A METHOD FOR PRODUCING THE LUMINESCENT MATERIAL

(75) Inventors: Daniel Becker, Augsburg (DE); Tim Fiedler, München (DE); Frank Jermann, Königsbrunn (DE); Bianca Pohl, Gilching (DE)

(73) Assignee: OSRAM Gesellschaft mit beschränkter Haftung, Munich (DE)

( * ) Notice: Subject to any disclaimer, the term of this patent is extended or adjusted under 35 U.S.C. 154(b) by 425 days.

(21) Appl. No.: 13/130,472

(22) PCT Filed: Oct. 26, 2009

(86) PCT No.: PCT/EP2009/064072
§ 371 (c)(1),
(2), (4) Date: Aug. 23, 2011

(87) PCT Pub. No.: WO2010/057745
PCT Pub. Date: May 27, 2010

(65) Prior Publication Data
US 2012/0037938 A1   Feb. 16, 2012

(30) Foreign Application Priority Data

Nov. 20, 2008   (DE) .......................... 10 2008 058 295

(51) Int. Cl.
*H01L 33/00*   (2010.01)
*C09K 11/77*   (2006.01)

(52) U.S. Cl.
CPC .................. *C09K 11/7734* (2013.01)
USPC .............. 257/98; 257/E33.068; 257/E33.061; 313/503

(58) Field of Classification Search
CPC ............. H01I 33/60; H01I 33/20; H01I 33/62
USPC .............. 257/98, E33.068, E33.061; 313/503
See application file for complete search history.

(56) References Cited

U.S. PATENT DOCUMENTS

| 2006/0076883 | A1* | 4/2006 | Himaki et al. ................ 313/503 |
| 2006/0220520 | A1 | 10/2006 | Sakane et al. |
| 2007/0252513 | A1* | 11/2007 | Justel et al. .................... 313/503 |

FOREIGN PATENT DOCUMENTS

| CN | 1337988 | 2/2002 |
| CN | 100334180 | 9/2005 |

(Continued)

OTHER PUBLICATIONS

Piao, et al. "Preparation of $(Sr_{1-x}Ca_x)_2Si_5N_8/EU^{2+}$ Solid Solutions and Their Luminescence Properties", Journal of the Electrochemical Society, Oct. 20, 2006, pp. 1-14.

(Continued)

*Primary Examiner* — Dale E Page
(74) *Attorney, Agent, or Firm* — Cozen O'Connor

(57) ABSTRACT

A red-emitting luminescent material that belongs to the class of nitridosilicates and is doped with at least one activator D, in particular Eu, wherein the material is a modified D-doped alkaline earth nitridosilicate $M_2Si_5N_8$, where M=one or more elements belonging to the group Sr, Ca, Ba, with the nitridosilicate having been stabilized by an oxidic or oxinitridic—in particular alkaline earth—phase.

14 Claims, 9 Drawing Sheets

(56) References Cited

FOREIGN PATENT DOCUMENTS

| | | |
|---|---|---|
| CN | 101044222 | 9/2007 |
| EP | 1 571 194 | 9/2005 |
| EP | 1 878 778 | 1/2008 |
| WO | WO 01/40403 | 6/2001 |
| WO | WO 2005/031797 | 4/2005 |

OTHER PUBLICATIONS

R.-J. Xie, et al. "A simple, efficient synthetic route to $Sr_2Si_5N_8:Eu^{2+}$ based red phosphors for white light-emitting diodes", Chemistry of Materials, vol. 18, No. 23, pp. 5578-5583, Oct. 19, 2006.

* cited by examiner

RED-EMITTING SR2SI5N8 LUMINESCENT MATERIAL AND LIGHT SOURCE HAVING A LUMINESCENT MATERIAL OF SUCH KIND AS WELL AS A METHOD FOR PRODUCING THE LUMINESCENT MATERIAL

RELATED APPLICATIONS

This is a U.S. national stage of application No. PCT/EP2009/064072, filed on Oct. 26, 2009.

This application claims the priority of German application no. 10 2008 058 295.6 filed Nov. 20, 2008, the entire content of which is hereby incorporated by reference.

FIELD OF THE INVENTION

The invention relates to a red-emitting luminescent material belonging to the class of nitridosilicates and doped with at least one activator D, in particular Eu. The invention relates further to a light source having a luminescent material of such kind and to a method for producing the luminescent material. The light source is in particular a conversion LED. Luminescent materials of such kind are intended particularly for use in white LEDs.

BACKGROUND OF THE INVENTION

WO 01/40403 shows a conversion LED that employs a red-emitting luminescent material belonging to the class of nitridosilicates. The material concerned is the luminescent material MxSiyNz:Eu, with M being represented by Ca, Sr, Ba, and/or Zn. What therein applies is that $z=\frac{2}{3}x+\frac{4}{3}y$. The foremost representatives are $M_2Si_5N_8$:Eu and $MSi_7N_3$:Eu.

SUMMARY OF THE INVENTION

One object of the present invention is to provide a red-emitting luminescent material that is characterized by a high degree of stability so is well suited for use also in thermally stressed environments. A further object is to provide a light source that has a luminescent material possessing those properties and a method for producing the luminescent material.

The luminescent material in accordance with an embodiment of the invention is a modified, preferably $Eu^{2+}$-doped, alkaline earth nitridosilicate $M_2Si_5N_8$, where M=one or more elements belonging to the group Sr, Ca, Ba, with the nitridosilicate having been stabilized by an oxidic—in particular alkaline earth—phase. The luminescent material will thereby ensure the provision of an efficient, stabilized emitting red luminescent material that can be excited by blue or ultraviolet light and has a dominant wavelength in the 600-nm range.

The $Eu^{2+}$-doped alkaline earth nitridosilicates $M_2Si_5N_8$, where M=one or more elements belonging to the group Sr, Ca, Ba, are a red-emitting luminescent-material system that has been known for quite a long time. However, $Sr_2Si_5N_8$ in particular, which is extremely interesting on account of its dominant wavelength of approximately 600 nm-610 nm, is limited in its applications owing to its chemical instability at higher temperatures (>100° C.) and when oxidized and exposed to high radiation.

While exhibiting no weaknesses in terms of emission stability, a competing system such as that of $CaAlSiN_3$ is precluded from many applications on account of its narrow useful range of emission wavelengths from 615 nm to 620 nm.

Thus to date no totally satisfactory solution is known for a red-emitting luminescent material system that exhibits a high degree of stability even when subjected to high temperatures.

$M_3N_2$, $Si_3N_4$, and $Eu_2O_3$ are needed as starting substances for preparing known $M_2Si_5N_8$. A novel stabilized alkaline earth nitridosilicate is obtained by extending the educt side at least to include $SiO_2$. The result is an initial mixture that stoichiometrically no longer yields $M_2Si_5N_8$ but is instead a modified $Eu^{2+}$-doped alkaline earth nitridosilicate $M_2Si_5N_8$, where M=one or more elements belonging to the group Sr, Ca, Ba, with the nitridosilicate having been stabilized at least by a second oxidic phase, in particular by $SiO_2$. In particular the educt side has been extended to include $SiO_2$ and additional $M_3N_2$.

In a specific embodiment variant the resulting product conforms to stoichiometry $(1-a)(M_2Si_5N_8:Eu)*a(SiO_2)$, with its preferably being the case that $0<a<0.25$.

In another specific embodiment variant the resulting product conforms to stoichiometry $(1-a-b)(M_2Si_5N_8:Eu)*a(SiO_2)*b(M'_3N_2)$, with its preferably being the case that $0<a<0.25$ and $0\leq b\leq 0.30$. M' is in particular therein different from the M used, for example M=Sr and M'=Ca. In particular, a and b are therein selected such as ultimately to yield a product in the form $(M_2Si_5N_8:Eu)*(M'_3Si_2O_4N_2:Eu)$ (M'=one or more elements belonging to the group Sr, Ca, Ba).

Generally, though, it is not simple stoichiometry that results as the product; rather it is the case that for describing the product a phase diagram has to be used that is based on the three partial components $SiN_{4/3}$, $SiO_2$, and $MN_{2/3}$.

M is preferably therein represented by Sr at over 50 mol. %

The percentage share of the entire doping means, here in particular Eu, of M ought generally to be in the 0.1-to-15-mol.-% range. Another or an additional doping agent such as, for example, Ce or Mn is not precluded. In particular, interesting systems are Eu, Mn on the one hand and Ce, Li (with or without Eu) on the other. Zi serves in the latter instance to provide charge compensation.

The luminescent material is suitable in particular for photonic excitation by a light source. Such sources are, for example, lamps such as fluorescent lamps or high-pressure discharge lamps, but in particular also conversion LEDs. The luminescent material can here be used in particular for generating white light. The RGB principle is therein usually applied. The inventive luminescent material is therein used for the red emission. Another luminescent material such as, for instance, a sion, in particular Ba sion as known per se, is used for the green emission. For the blue emission, what is best suited is the primary radiation of a blue-emitting LED; a peak wavelength of 410 to 500 nm is preferred.

A blue luminescent material such as BAM can additionally be used in the case of a peak wavelength of 410 to 430 nm. Excitation can in the case of long-wave excitation in the 470-to-500-nm range be provided by another luminescent material's secondary radiation.

The relative percentage shares of the phase triangle $SiN_{4/3}$, $SiO_2$, $MN_{2/3}$ are preferably in a range having the following key points, with the sum in each case adding to 100 mol. %:

(1) $SiO_2:SiN_{4/3}:MN_{2/3}=7.5\%:97.5\%:25\%$
(2) $SiO_2:SiN_{4/3}:MN_{2/3}=17.5\%:57.5\%:25\%$
(3) $SiO_2:SiN_{4/3}:MN_{2/3}=7.5\%:47.5\%:45\%$
(4) $SiO_2:SiN_{4/3}:MN_{2/3}=17.5\%:37.5\%:45\%$.

What applies particularly preferably is:

(1) $SiO_2:SiN_{4/3}:MN_{2/3}=10\%:65\%:25\%$
(2) $SiO_2:SiN_{4/3}:MN_{2/3}=15\%:60\%:25\%$
(3) $SiO_2:SiN_{4/3}:MN_{2/3}=10\%:45\%:45\%$
(4) $SiO_2:SiN_{4/3}:MN_{2/3}=15\%:40\%:45\%$.

BRIEF DESCRIPTION OF THE DRAWINGS

The invention is described in more detail below with the aid of several exemplary embodiments.

PREFERRED EMBODIMENTS OF THE INVENTION

Figure 1:
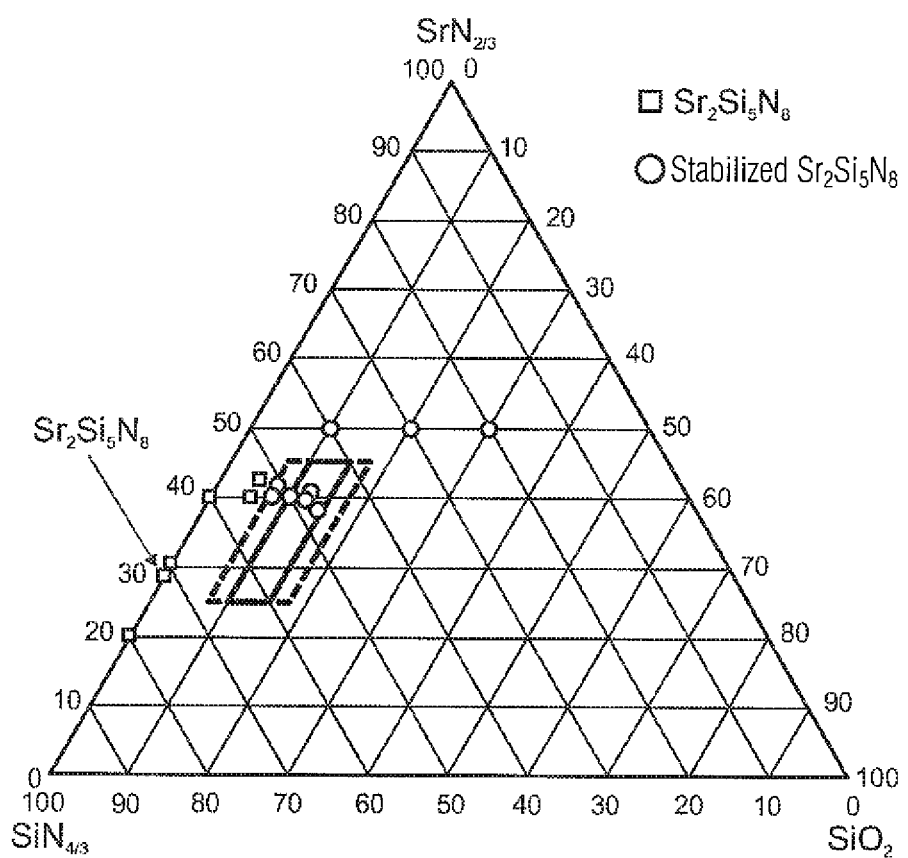
FIG. 1 is a phase diagram that localizes known and novel stabilized nitridosilicates.

Exemplary embodiments of the novel red-emitting luminescent material are as follows. The resulting dominant emission wavelength is therein in the 595-to-6.0-nm range.

a) Initial Mixture 1, Normal Nitridosilicate 8.7 g $Sr_3N_2$, 10.9 g $Si_3N_4$, and 0.3 g $Eu_2O_3$ are weighed-in in a protective-gas atmosphere and homogenized. The educt mixture is then roasted in the tube or chamber furnace for several hours in a reducing atmosphere at temperatures of between 1,200° C. and 1,800° C. That can be followed by a second roasting, likewise in a reducing atmosphere, at between 1,200° C. and 1,800° C.

b) Initial Mixture 2, Stabilized Nitridosilicate 10.9 g $Sr_3N_2$, 1.7 g $SiO_2$, 6.8 g $Si_3N_4$, and 0.4 g $Eu_2O_3$ are weighed-in in a protective-gas atmosphere and homogenized. The educt mixture is then roasted in the tube or chamber furnace for several hours in a reducing atmosphere at temperatures of between 1,200° C. and 1,800° C. That can be followed by a second roasting, likewise in a reducing atmosphere, at between 1,200° C. and 1,800° C.

c) Initial Mixture 3, Stabilized Nitridosilicate 11.5 g $Sr_3N_2$, 0.9 g $SiO_2$, 7.2 g $Si_3N_4$, and 0.4 g $Eu_2O_3$ are weighed-in in a protective-gas atmosphere and homogenized. The educt mixture is then roasted in the tube or chamber furnace for several hours in a reducing atmosphere at temperatures of between 1,200° C. and 1,800° C. That can be followed by a second roasting, likewise in a reducing atmosphere, at between 1,200° C. and 1,800° C.

d) Initial Mixture 4, Stabilized Nitridosilicate 10.7 g $Sr_3N_2$, 2.2 g $SiO_2$, 6.7 g $Si_3N_4$, and 0.4 g $Eu_2O_3$ are weighed-in in a protective-gas atmosphere and homogenized. The educt mixture is then roasted in the tube or chamber furnace for several hours in a reducing atmosphere at temperatures of between 1,200° C. and 1,800° C. That can be followed by a second roasting, likewise in a reducing atmosphere, at between 1,200° C. and 1,800° C.

e) Initial Mixture 5, Stabilized Nitridosilicate 8.8 g $Sr_3N_2$, 1.2 g $Ca_3N_2$, 2.7 g $SiO_2$, 6.9 g $Si_3N_4$, and 0.4 g $Eu_2O_3$ are weighed-in in a protective-gas atmosphere and homogenized. The educt mixture is then roasted in the tube or chamber furnace for several hours in a reducing atmosphere at temperatures of between 1,200° C. and 1,800° C. That can be followed by a second roasting, likewise in a reducing atmosphere, at between 1,200° C. and 1,800° C.

TABLE 1

Color point, quantum efficiency, brightness

| Sample | Initial | Eu (mol. %) | x | y | $\lambda_{dom}$ (nm) | $\lambda_{eff}$ (nm) | Rel. Q.E. (%) | Rel. brightness (%) |
|---|---|---|---|---|---|---|---|---|
| BP 001/07 | 1 | 2 | 0.627 | 0.371 | 600.3 | 635.2 | 100 | 100 |
| BP 047/07 | 2 | 2 | 0.627 | 0.372 | 600.1 | 631.2 | 101 | 105 |
| KO | | | | | | | | |
| BP 075/07 | 3 | 2 | 0.626 | 0.373 | 599.9 | 631.2 | 95 | 101 |
| BP 084/07 | 4 | 2 | 0.626 | 0.372 | 600.1 | 631.6 | 101 | 105 |
| BP 059/08 | 5 | 2 | 0.638 | 0.361 | 602.6 | 644.1 | 103 | 112 |

Proceeding generally from the $M_2Si_5N_8$ point toward the dashed line, we find the quantum efficiency will first drop dramatically before climbing again at the marked region's boundary. That is illustrated by way of example with M=Sr. M is here preferably predominantly more than 50 mol. %, particularly preferably M=Sr. The percentage share of Eu in M is preferably 0.1 to 15 mol. %. The exemplary region having the key points—which region is identified in the phase triangle by the dashed line—is therefore preferably (the associated stoichiometry is indicated in parentheses):

(1) $SiO_2$:$SiN_{4/3}$:$SrN_{2/3}$=7.5%:67.5%:25% ($Sr_{2.5}Si_{7.5}O_{1.5}N_{10.67}$)

(2) $SiO_2$:$SiN_{4/3}$:$SrN_{2/3}$=17.5%:57.5%:25% ($Sr_{2.5}Si_{7.5}O_{3.5}N_{9.33}$)

(3) $SiO_2$:$SiN_{4/3}$:$SrN_{2/3}$=7.5%:47.5%:45% ($Sr_{4.5}Si_{5.5}O_{1.5}N_{9.33}$)

(4) $SiO_2$:$SiN_{4/3}$:$SrN_{2/3}$=17.5%:37.5%:45% ($Sr_{4.5}Si_{5.5}O_{3.5}N_8$), which is characterized by a relative loss of <40% in terms of the quantum efficiency of the best stabilized $Sr_2Si_5N_8$ sample.

Having quantum efficiencies of more than 70%, the region identified by the unbroken line is to be given particular preference. The rectangle is here described by the following key points:

(A) $SiO_2$:$SiN_{4/3}$:$SrN_{2/3}$=10%:65%:25% ($Sr_{2.5}Si_{7.5}O_2N_{10.33}$)

(B) $SiO_2$:$SiN_{4/3}$:$SrN_{2/3}$=15%:60%:25% ($Sr_{2.5}Si_{7.5}O_2N_9$)

(C) $SiO_2$:$SiN_{4/3}$:$SrN_{2/3}$=10%:45%:45% ($Sr_{4.5}Si_{5.5}O_2N_9$)

(D) $SiO_2$:$SiN_{4/3}$:$SrN_{2/3}$=15%:40%:45% ($Sr_{4.5}Si_{5.5}O_3N_{8.33}$)

TABLE 2

Positions of the most important reflexes of the novel phase

| No. | 2theta/TOF (+/−0.2) | $I_{obs}$ |
|---|---|---|
| 1 | 22.7 | Weak |
| 2 | 24.8 | Weak |
| 3 | 29.6 | Weak |
| 4 | 32.4 | Strong |
| 5 | 39.9 | Medium |
| 6 | 46.5 | Medium |
| 7 | 52.2 | Weak |
| 8 | 57.7 | Medium |

Adding $SiO_2$ to the initial mixture results in a second phase that significantly improves the luminescent material $M_2Si_5N_8$:D—with D being represented preferably by Eu—in terms of all its limiting characteristics while not weakening it in any of its characteristics. The resulting ancillary phase is a hitherto unknown, probably oxinitridic phase, which according to current knowledge crystallizes in the structure of $Ba_3Al_2O_6$ (space group $Pa\bar{3}$ (No. 205) and lattice parameter a 15.650(1)A).

Figure 7:
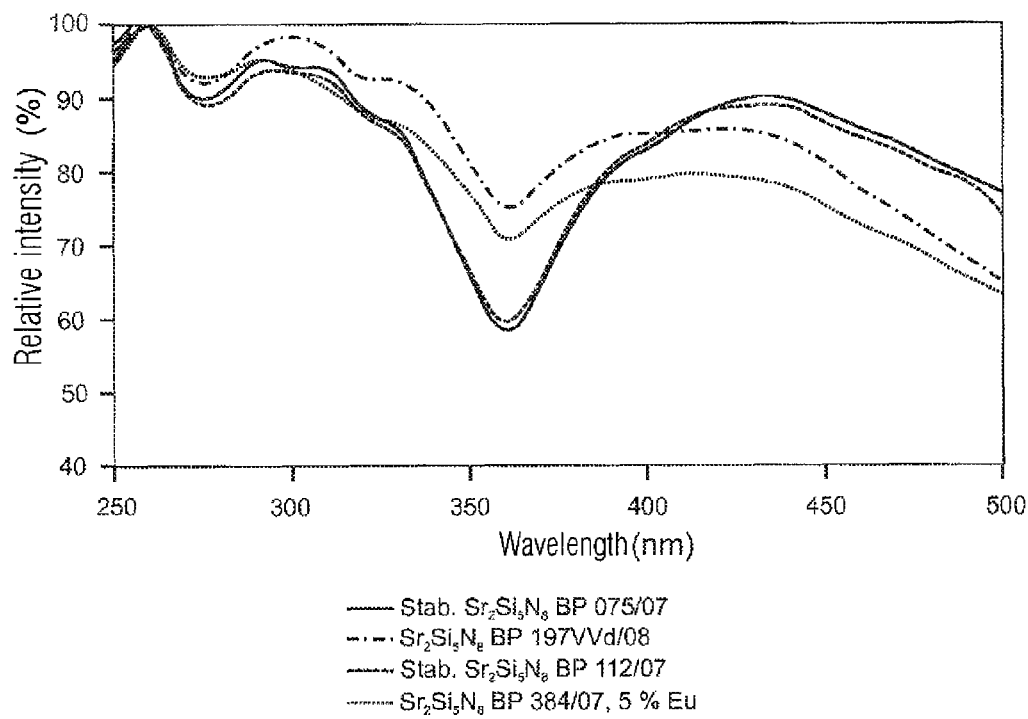
FIG. 7 shows the excitability of various luminescent materials as a function of wavelength.

FIG. 7 shows differences in the normal and stabilized nitridosilicate's excitability. While the excitability of stabilized Eu-doped $Sr_2Si_5N_8$ breaks down at an excitation wavelength of 360 nm more intensely than that of normal $Sr_2Si_5N_8$, the former has significantly better excitability between 410 and 500 nm, which is advantageous specifically in the case of excitation by a blue LED chip.

$Sr_2Si_5N_8$, which is unstable in all respects and whose dominant emission wavelength of approximately 600-610 nm is favorable for numerous applications, can be stabilized in all the above aspects (temperature quenching, laser stability, oxidation stability) without detriment to its optical properties.

Figure 2:
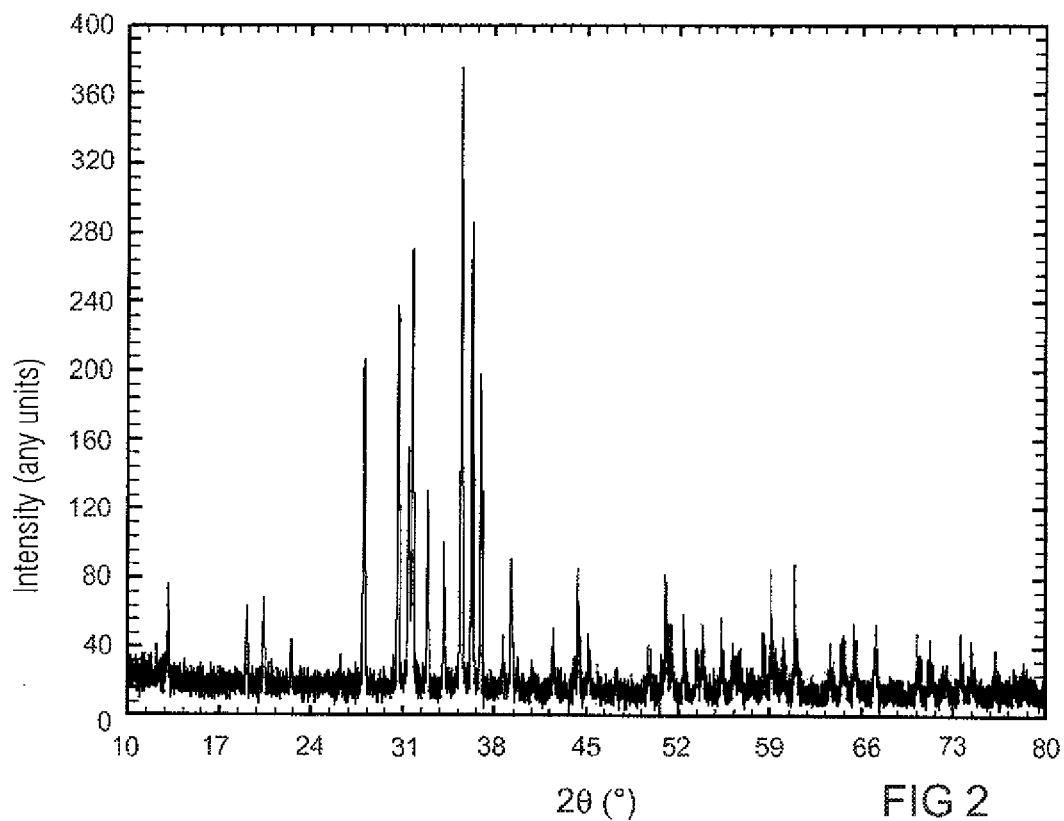
FIG. 2 is a powder diffractogram of a known nitridosilicate $Sr_2Si_5N_8$:Eu.

FIG. 2 is the powder diffractogram of Sr nitridosilicate $Sr_2Si_5N_8$:Eu as known per se. By contrast, the powder diffractogram of modified $SiO_2$-stabilized $Sr_2Si_5N_8$:Eu shown in FIG. 3 exhibits totally different peaks.

Figure 3:
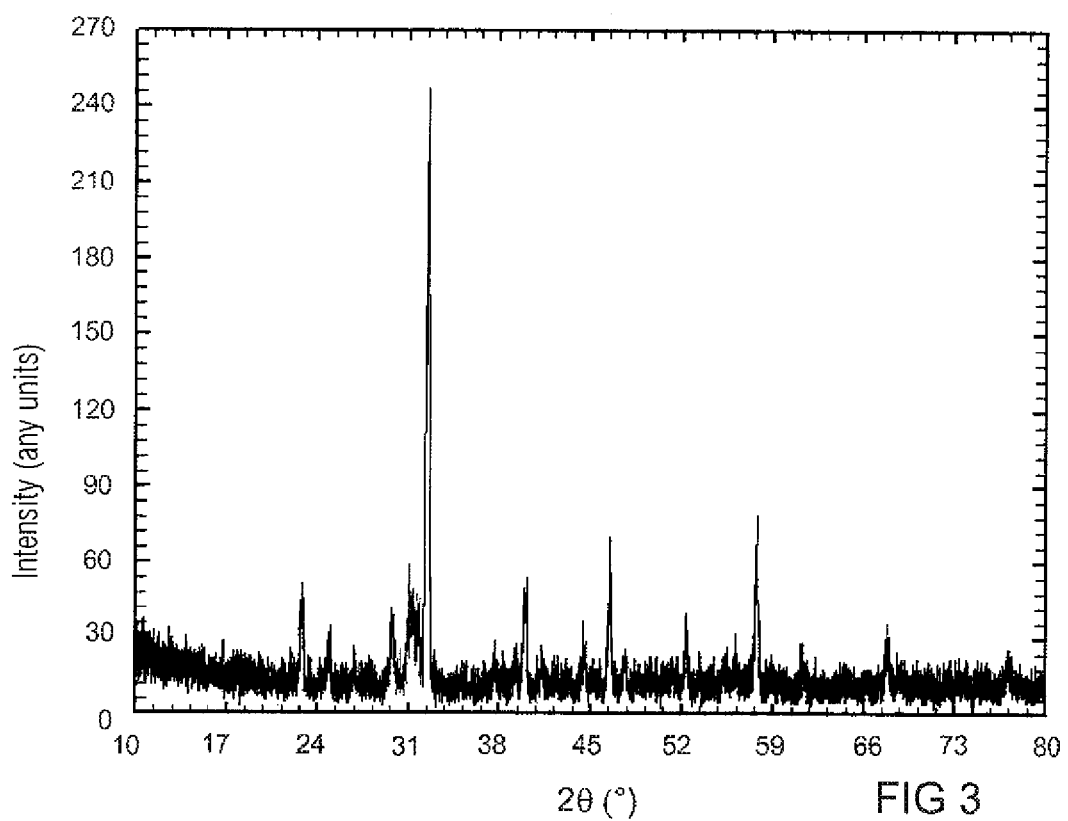
FIG. 3 is a powder diffractogram of a stabilized nitridosilicate $Sr_2Si_5N_8$:Eu*$nSiO_2$.
Figure 4:
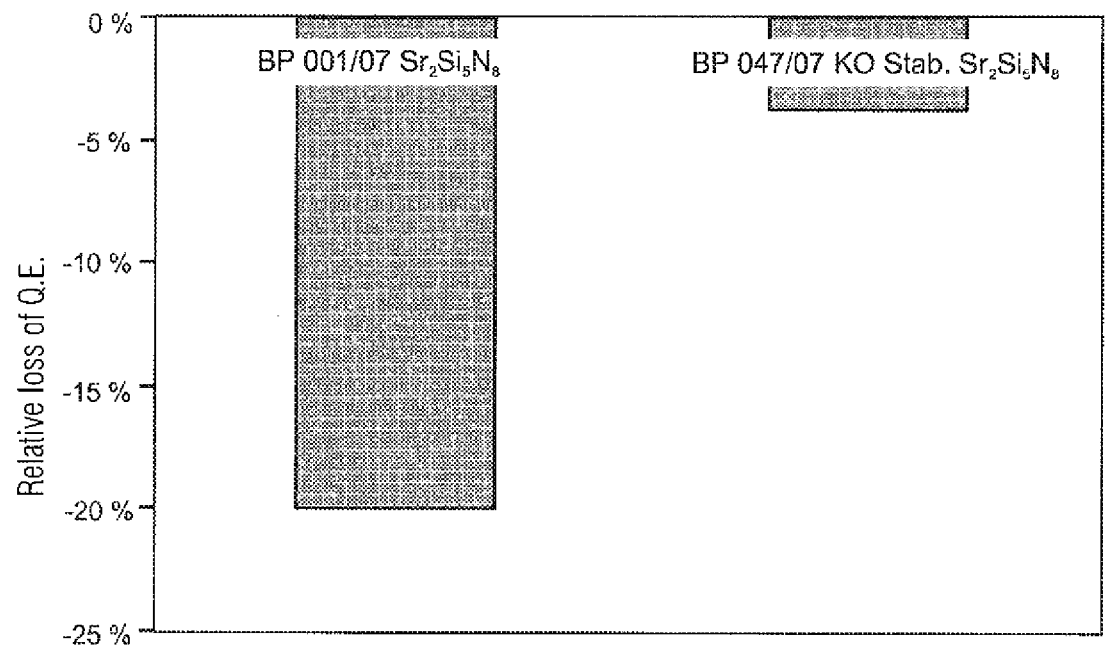
FIG. 4 shows the relative loss of quantum efficiency after an oxidation test for the two luminescent materials shown in FIGS. 2 and 3.

FIG. 4 shows the relative loss of quantum efficiency for normal and modified Sr nitridosilicate as shown in FIGS. 2 and 3.

Figure 5:
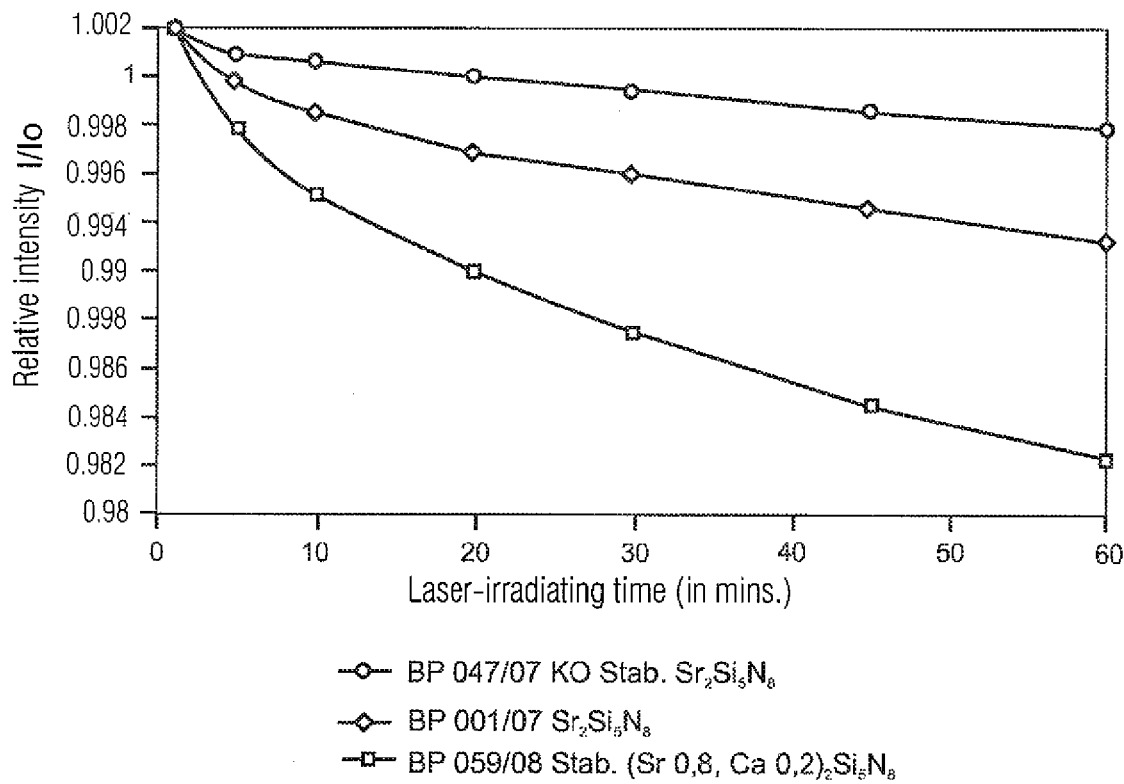
FIG. 5 shows the result of a stress test using a high irradiation strength for the two luminescent materials shown in FIGS. 2 and 3.

FIG. 5 shows the stability for normal and modified Sr nitridosilicate as shown in FIGS. 2 and 3 when exposed to a high level of laser radiation. The exposure length is therein indicated as an abscise. The ordinate shows the relative intensity of the radiation.

Figure 6:
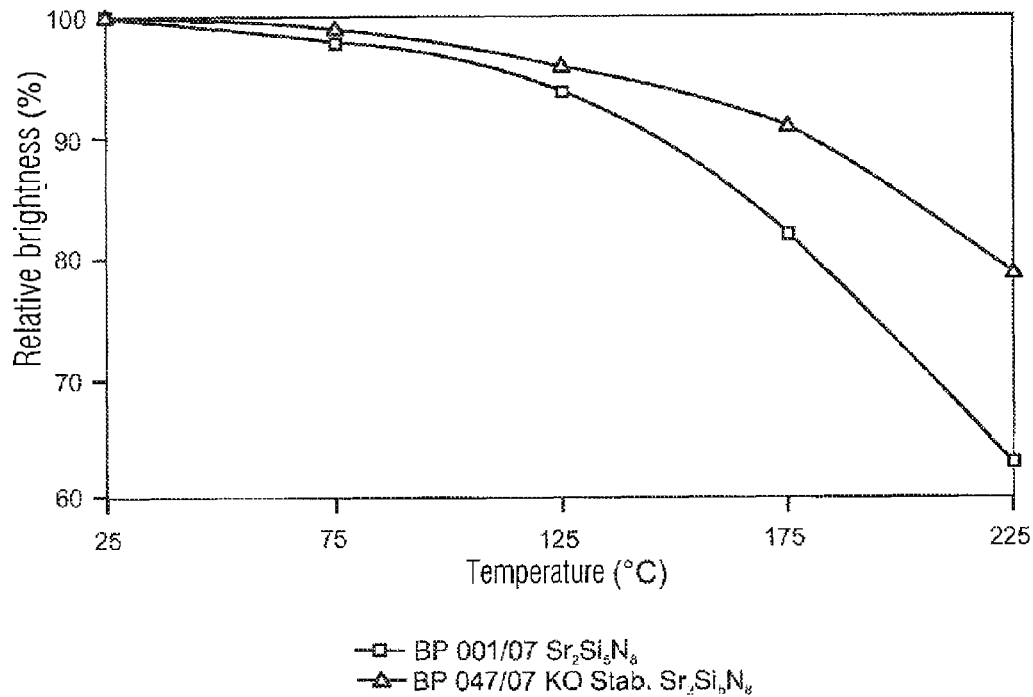
FIG. 6 shows the measurement of the quenching characteristics for the two luminescent materials shown in FIGS. 2 and 3 as a function of temperature.

FIG. 6 shows temperature quenching for normal and modified Sr nitridosilicate as shown in FIGS. 2 and 3. The abscise is therein the temperature in degrees Celsius and the ordinate is the brightness compared with the brightness at 25° C., meaning not under temperature stress.

FIG. 7 shows the excitability of various luminescent materials as a function of excitation wavelength.

Figure 8:
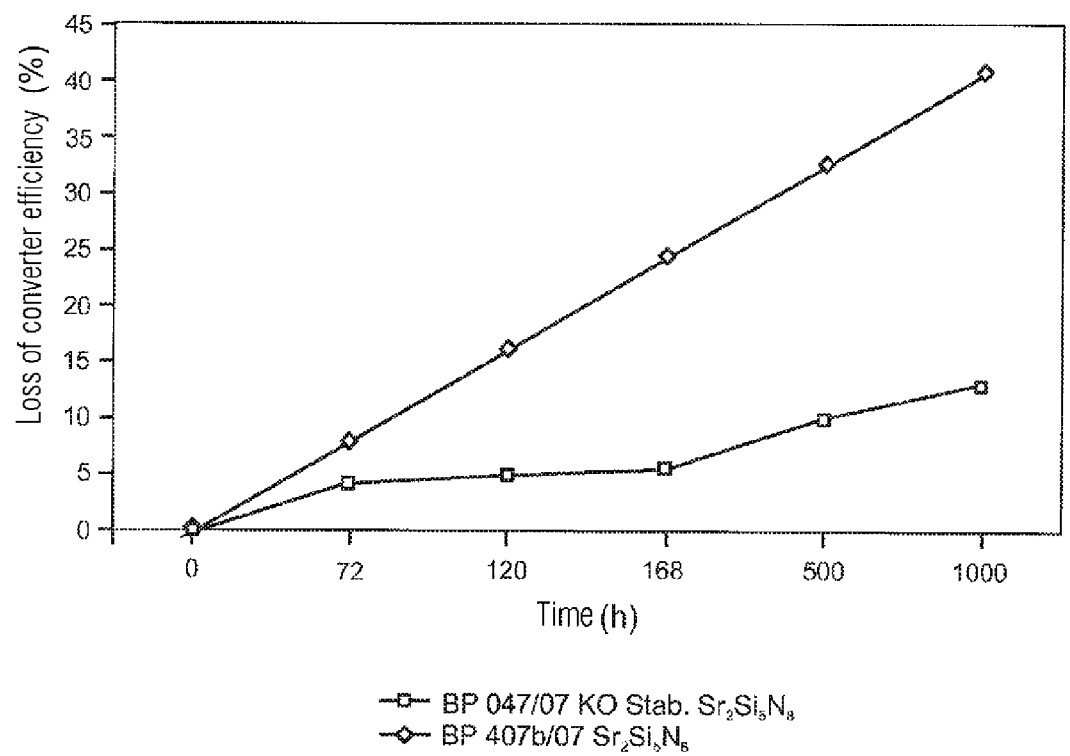
FIG. 8 shows the loss of efficiency of a conversion LED as a function of time.

FIG. 8 shows the loss of conversion efficiency of stabilized and normal $Sr_2Si_5N_8$:Eu as a function of time (in hours). The length of radiation exposure is therein plotted as the abscise. The ordinate is the percentage loss.

Figure 9:
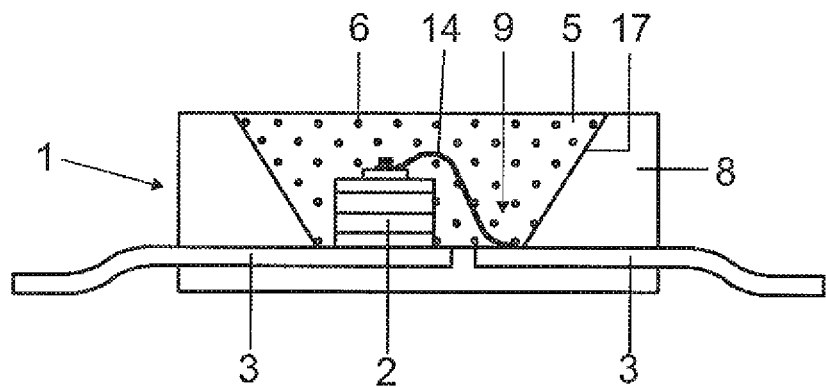
FIG. 9 is a schematic of a conversion LED.

According to FIG. 9, a conversion LED 1 has a chip 2 that emits the primary radiation. The primary radiation is most generally blue with a peak wavelength in the 420-to-480-nm, preferably 450-to-470-nm, range. It can, though, also be a UV LED, with the primary radiation most generally being in the 360-to-420-nm range.

The chip is connected to electric terminals 3 and a bond wire 14. It is surrounded by a housing 8 acting as a reflector 17.

Mounted on the chip is a potting 5 containing a luminescent-material mixture 6 in dispersion form. The luminescent materials are a red-emitting luminescent material of the modified nitridosilicate type and a yellow-green luminescent material such as, for instance, YAG:Ce or a sion such as $BaSi_2O_2N_2$:Eu.

Figure 10:
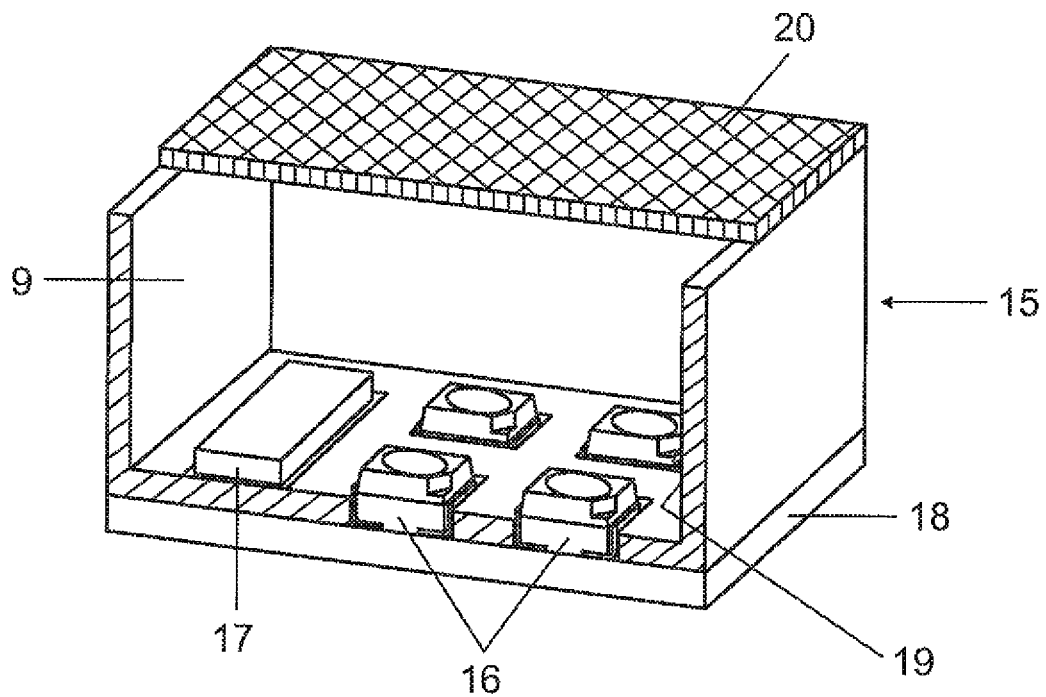
FIG. 10 shows the converter loss in percentage terms for a stabilized nitride.

FIG. 10 shows as an alternative an exemplary embodiment in which a plurality of LEDs 16 are accommodated together with an electronic control 17 in a module 15 having a baseplate 18 and walls 19. The luminescent material is here applied to the inside of the walls or only on cover plate 20.

Figure 11:
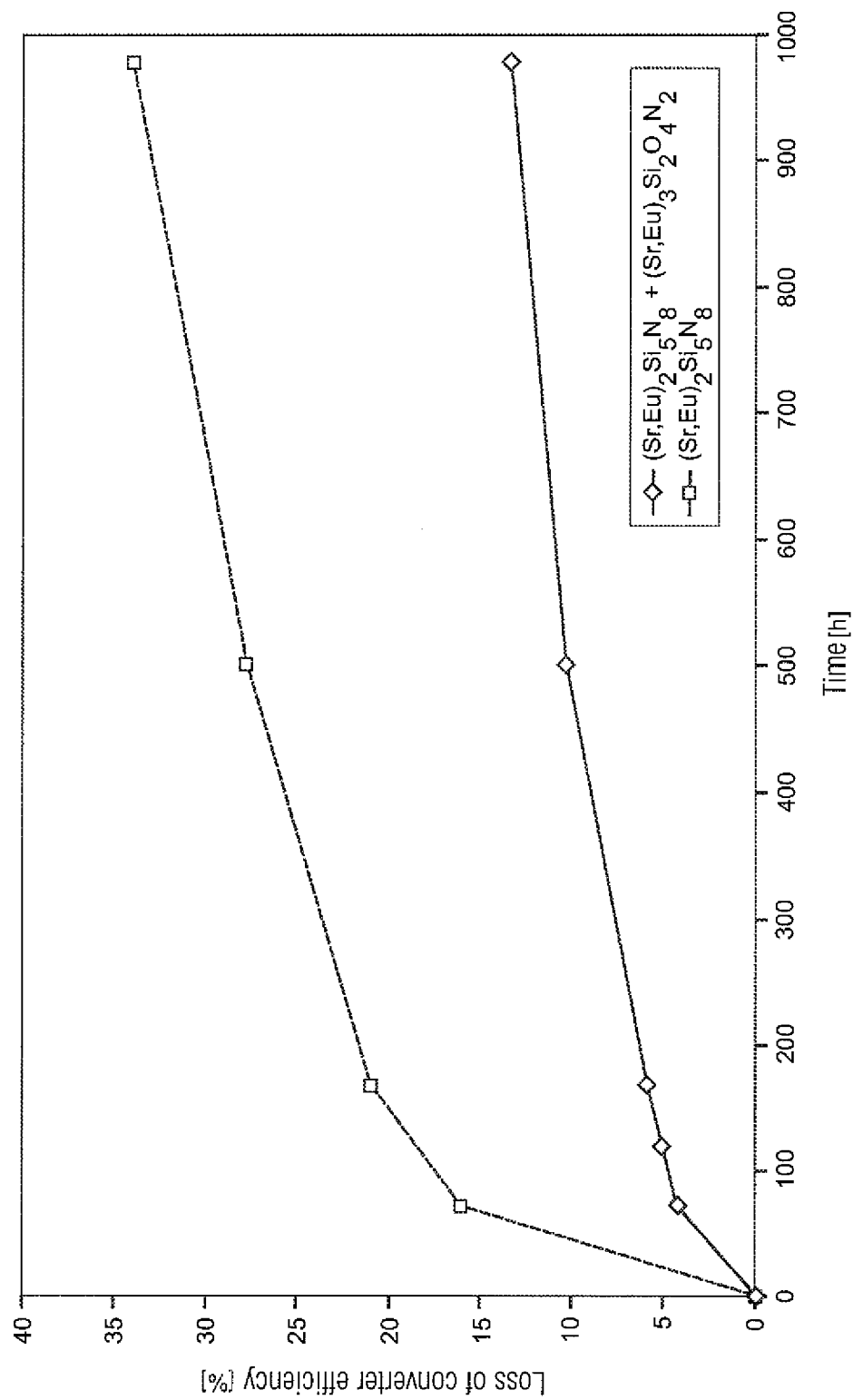
FIG. 11 shows the converter loss in percentage terms for a non-stabilized nitride.
Figure 12:
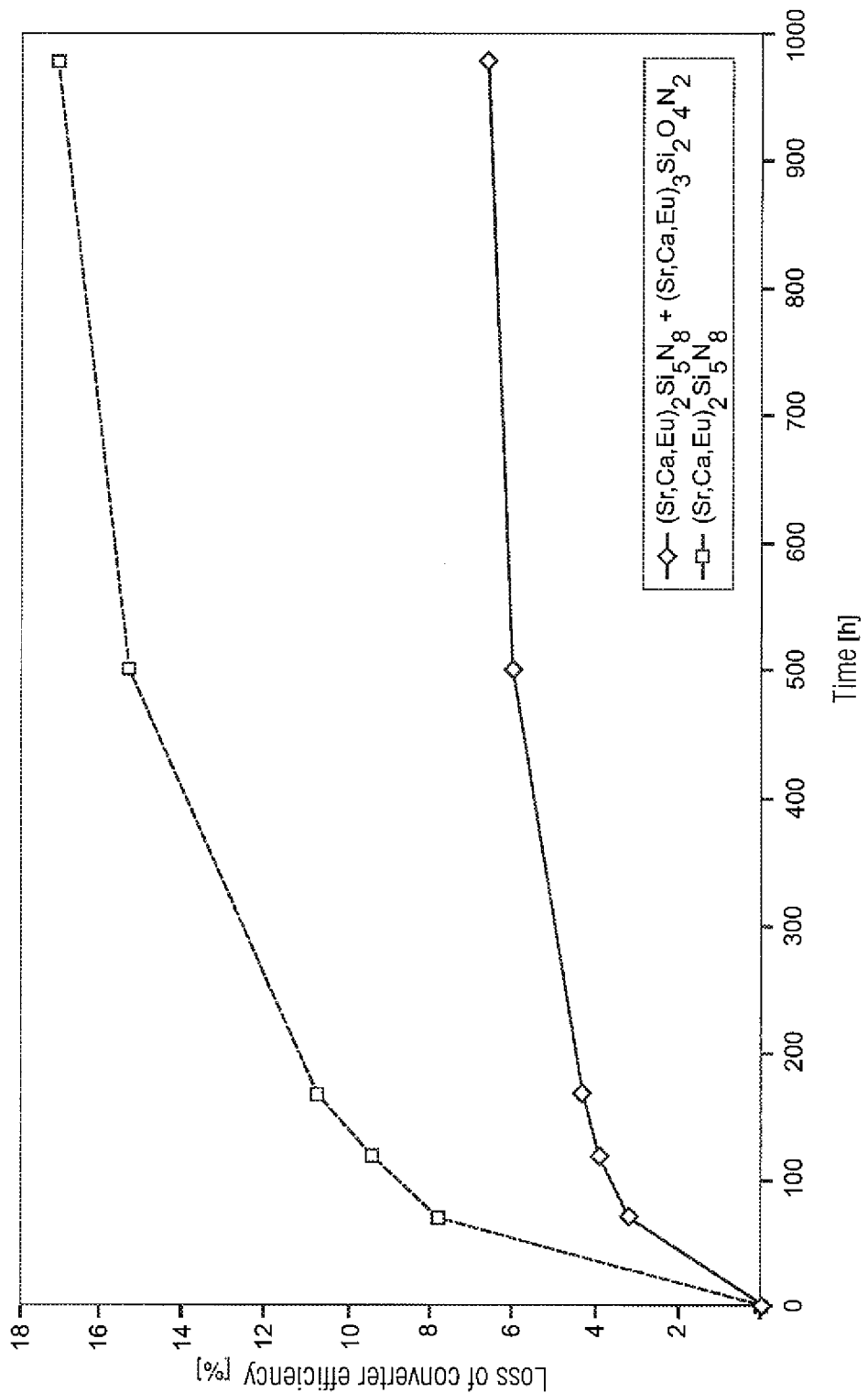
FIG. 12 shows the spectrum for an LED having a stabilized nitride.

FIG. 11 shows the converter loss as a function of time for a stabilized nitride in which a=b. M=Sr and M'=Sr, Ca therein. Stabilizing is much better than in the case of a non-stabilized customary nitride whose converter loss (as a percentage) is shown in FIG. 12.

Figure 13:
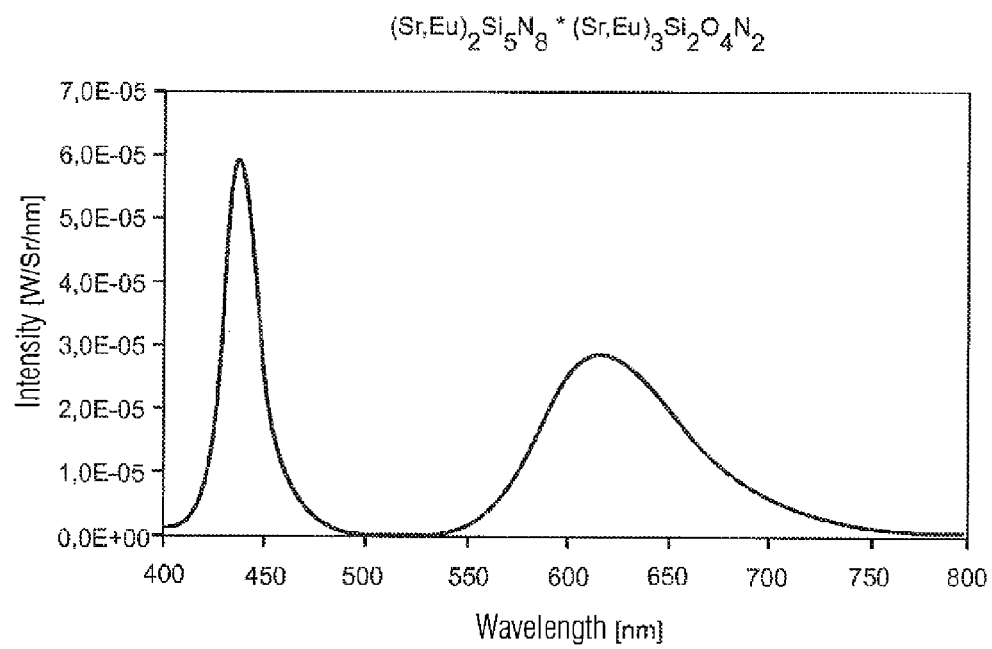
FIG. 13 shows the spectrum for an LED having a non-stabilized nitride.
Figure 14:
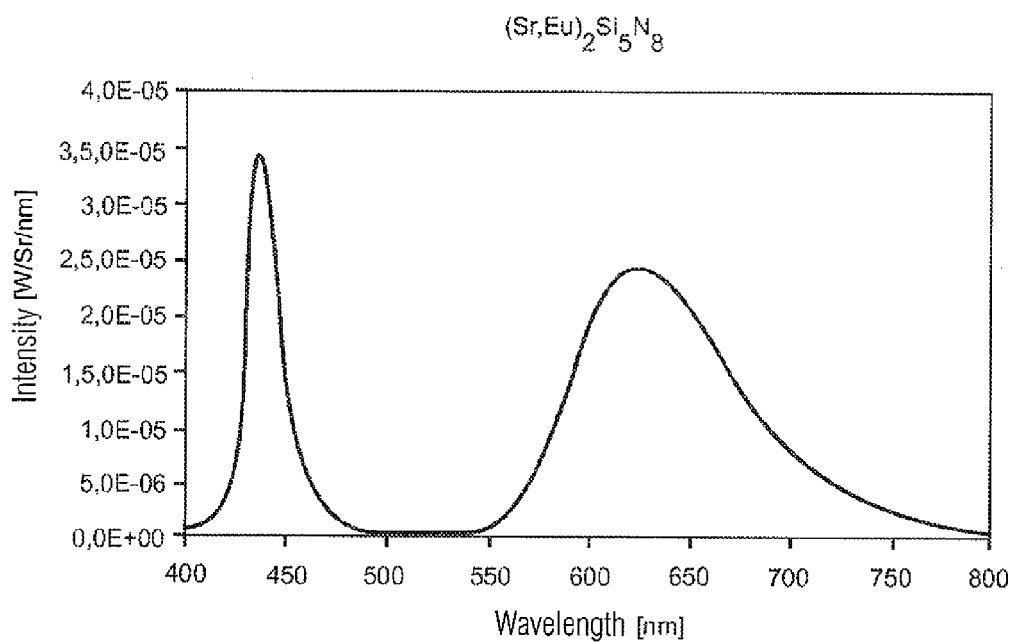
FIG. 14 shows the spectrum for another LED having a non-stabilized nitride.

FIG. 13 shows the spectrum of an LED having a stabilized nitride at the beginning and after ageing. The stability is much greater than in the case of the spectrum shown in the comparison (see FIG. 14) of an LED having a non-stabilized nitride.

TABLE 3

Color point, quantum efficiency, brightness

| Sample | Type | Eu (mol. %) | x | y | $\lambda_{dom}$ (nm) | $\Lambda_{wk}$ (nm) | Rel. Q.E. (%) | Rel. brightness (%) |
|---|---|---|---|---|---|---|---|---|
| BP 001/07 | $Sr_2Si_5N_8$ | 2 | 0.627 | 0.371 | 600.3 | 635.2 | 100 | 100 |
| BP 047/07 KO | Stab. $Sr_2Si_5N_8$ | 2 | 0.627 | 0.372 | 600.1 | 631.2 | 101 | 105 |
| BP 048/07 KO | Stab. $Sr_2Si_5N_8$ | 10 | 0.656 | 0.343 | 607.3 | 656.4 | 90 | 107 |
| BP 084/07 | Stab. $Sr_2Si_5N_8$ | 2 | 0.626 | 0.372 | 600.1 | 631.6 | 101 | 105 |
| BP 084a/07 | Stab. $Sr_2Si_5N_8$ | 2 | 0.626 | 0.372 | 600.1 | 632.6 | 98 | 107 |
| BP 059/08 | Stab. $(Sr_{0.8}Ca_{0.2})_2Si_5N_8$ | 2 | 0.638 | 0.361 | 602.6 | 644.1 | 103 | 112 |

TABLE 4

Changes after oxidation test (68 h at 150° C. in air atmosphere)

|  | BP 001/07 $Sr_2Si_5N_8$ | | BP 047/07 KO Stab. $Sr_2Si_5N_8$ | |
|---|---|---|---|---|
|  | Before ox. test | After ox. test | Before ox. test | After ox. test |
| Rel. quantum efficiency (%) | 100 | 79.8 | 100 | 94.7 |
| Color point x/y | 0.627/ 0.371 | 0.626/ 0.372 | 0.627/ 0.372 | 0.626/ 0.372 |
| Dominant wavelength (nm) | 600.3 | 600.1 | 600.1 | 600.1 |
| Effective wavelength (nm) | 635.2 | 634.5 | 631.2 | 631.2 |
| Brightness rel. to standard (%) | 100 | 76.0 | 100 | 89.5 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A red-emitting luminescent material that belongs to the class of nitridosilicates and is doped with at least one activator D, wherein the material is a modified D-doped alkaline earth nitridosilicate $M_2Si_5N_8$, where M=one or more elements belonging to the group Sr, Ca, Ba, with the nitridosilicate having been stabilized by an oxidic or oxinitridic phase,
   wherein the stabilized luminescent material exhibits stoichiometry $(Sr_{1+y}M_{1-y}Si_5N_8:D)*ax(SiO_2)*bx(M'_3N_2)$, $a \geq 0$, $b \geq 0$, $a+b>0$, $x=1/(1-a-b)$, $y>0$, and M' can be an element or combination of elements, including those of M.

2. The luminescent material as claimed in claim 1, wherein the percentage share of the activator D of M is in the 0.1-to-15-mol.-% range.

3. A conversion LED, having a luminescent material as claimed in claim 1.

4. The conversion LED as claimed in claim 3, wherein the conversion LED emits white light.

5. The conversion LED as claimed in claim 3, wherein the luminescent material is energized by means of radiation whose peak is in the 410-to-500-nm range.

6. The conversion LED as claimed in claim 3, wherein the luminescent material's dominant emission wavelength is in the 595-to-610-nm range.

7. The conversion LED as claimed in claim 3, wherein a second luminescent material that emits yellow-green light is used for a white-emitting LED.

8. The conversion LED as claimed in claim 3, wherein the luminescent material is integrated in the LED.

9. The conversion LED as claimed in claim 3, wherein the luminescent material has been separately applied to a carrier.

10. The conversion LED as claimed in claim 3, wherein the chip emits primary radiation in the UV-to-blue range, with at least one further luminescent material possibly also being used.

11. The luminescent material of claim 1, wherein said activator D is Eu and said oxidic or oxinitridic phase is an alkaline earth phase.

12. The conversion LED as claimed in claim 3, wherein the luminescent material is energized by means of radiation whose peak is in the 430-to-465-nm range.

13. The conversion LED as claimed in claim 8, wherein the luminescent material is integrated in a potting compound positioned in front of a chip.

14. The conversion LED as claimed in claim 3, wherein the chip emits primary radiation in the 360-nm-to-480-nm range, with at least one further luminescent material possibly also being used.

* * * * *